April 3, 1951  P. W. BAILEY  2,547,613
WASHBASIN FOR USE IN AUTOMOBILES
Filed July 6, 1948
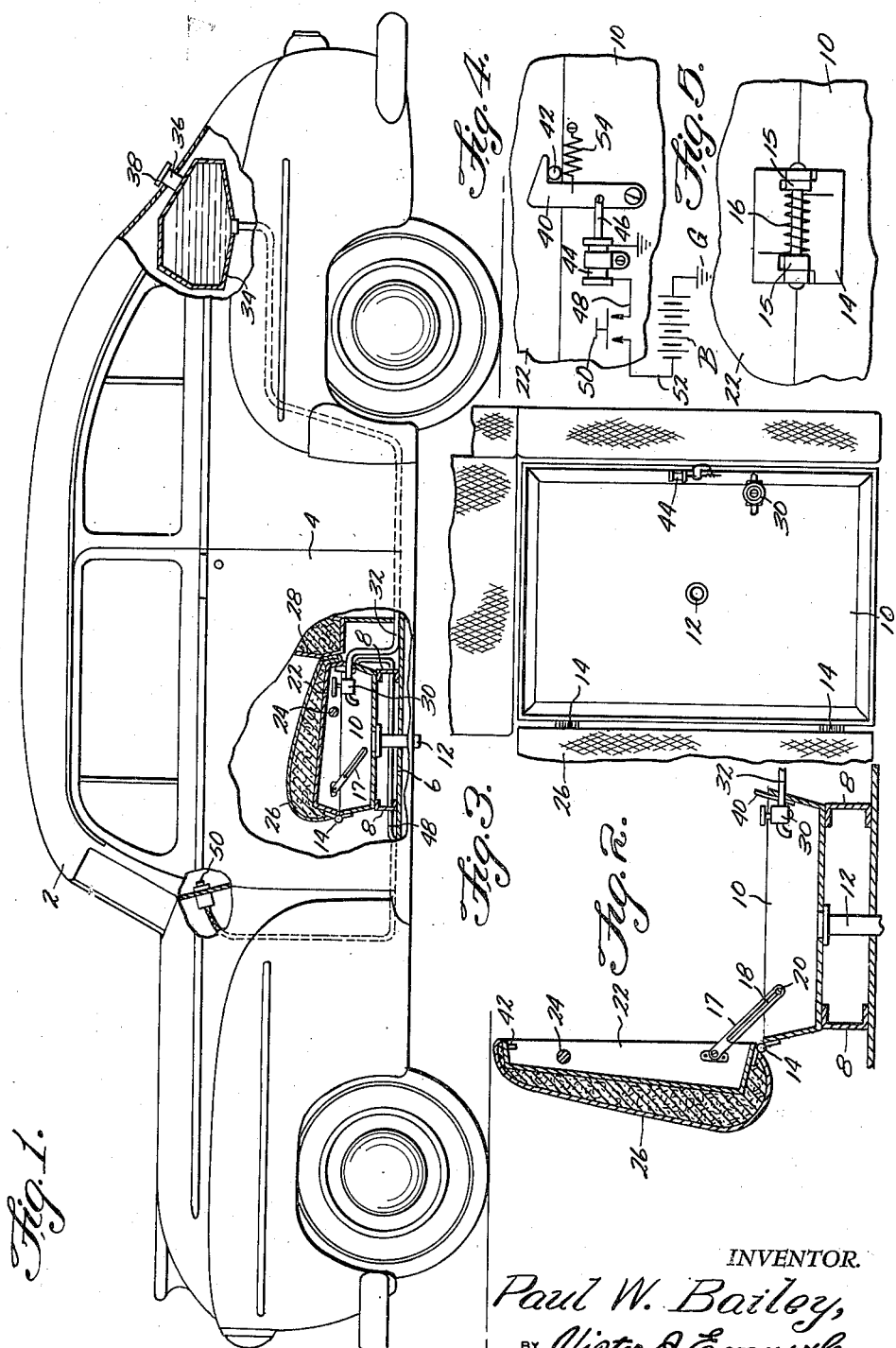
INVENTOR.
Paul W. Bailey,
BY Victor J. Evans & Co.
ATTORNEYS Patented Apr. 3, 1951

2,547,613

UNITED STATES PATENT OFFICE 2,547,613

WASHBASIN FOR USE IN AUTOMOBILES

Paul W. Bailey, Oakland, Calif.

Application July 6, 1948, Serial No. 37,267

1 Claim. (Cl. 296—1)

My present invention relates to an improved wash basin for use in automobiles and especially to a basin located out of sight and requiring no ordinarily usable space being located under the front seat of a vehicle, and having an elevated water reservoir located to the rear of and above the rear seat.

In carrying out my invention I employ a novel and unique combination and arrangement of parts according to the best mode I have thus far devised but it will be understood that various changes and alterations may be made in the exemplified structure within the scope of the appended claim.

In the drawings—

Figure 1 is a side elevational view of a conventional automobile partially broken away for clarity of observation and showing the basin and storage tank of my invention.

Figure 2 is a sectional view through the front seat showing the seat raised and the basin accessible for use.

Figure 3 is a top plan view of the basin with the cover open.

Figure 4 is a diagrammatic view of the electrical circuit employed to provide remote controlled unlatching of the basin cover.

Figure 5 is a plan view of one of the hinges for the cover and basin.

Referring now to the drawings wherein I have illustrated the present preferred embodiment of my invention I have shown a conventional automobile of the sedan type 2, having the usual door 4, and the floor of the vehicle 6 carries the transverse supports 8 for the basin 10. This basin may be of suitable material as stainless steel, or any other desirable material and has a drain or outlet 12 extending through the vehicle floor so as to discharge the water onto the road or ground.

Along the front edge of the basin I provide a pair of hinges 14 having offset shoulders 15 and springs 16 to insure that the cover is retained in open position after being manually raised.

A support 17 slotted at 18 for engagement with the pin 20 is provided for the cover 22 and a transverse rod 24 in the cover is well adapted for use as a towel rod or rack.

The cover is covered as at 26 to form a seat cushion which when folded down as in normal position abuts the back rest 28.

A faucet 30 is provided in the basin and is connected by pipe 32 to the reservoir tank 34 for fresh water and this tank is preferably located to the rear of and above the rear seat of the vehicle to insure gravity flow of the water supply and to maintain the tank out of the way. A filler neck 36 has a cap 38 outside the body of the vehicle so that the tank may with facility be filled from the outside.

To secure the cover and seat in folded position I employ a hook 40 on the basin 10 engageable with a pin 42 on the cover 22 and this hook is operably connected to a solenoid 44 by the link 46. A wire 48 connects the solenoid with the instrument board switch 50 and wire 52 leads to the battery B and to ground G.

Thus by pressing the switch button, the hook is released against the tension of the spring 54 so that the cover and seat may be raised. Then after suitably stopping the drain a supply of water is admitted by the faucet and the basin may easily and readily be used for performing the necessary ablutions.

When finished, the seat and cover are folded down and the spring will insure the engagement of the hook with the pin 42. The entire assembly is normally maintained out of sight and in otherwise unused space and clearly the device of my invention will provide the traveler with easily accessible means for removing the dirt and grime of road travel.

Having thus fully described my invention what I claim as new and desire to secure by Letters Patent is:

In a vehicle having a floor and a front back rest, the combination of a substantially rectangular basin mounted on the floor adjacent the back rest, a drain extending from said basin through the vehicle floor, a pair of hinges on said basin, said hinges being forward of the back rest, a cover secured to said hinges whereby said cover will cover or uncover said basin by pivoting toward and away from the back rest, a seat cushion supported on said cover for cooperation with the back rest, a hook pivoted to said basin within the same thereof, a pin on said cover, spring means biasing said hook into engagement with said pin for locking said cover in closed position, electromagnetic means for moving said hook away from said pin, a water tank mounted in the car and conduit means placing said tank in communication with said basin for supplying water thereto.

PAUL W. BAILEY.

REFERENCES CITED

The following references are of record in the file of this patent:

UNITED STATES PATENTS

| Number | Name | Date |
|---|---|---|
| 1,289,225 | Montan | Dec. 31, 1918 |
| 1,422,763 | Hollis | July 11, 1922 |
| 1,426,018 | Sullivan | Aug. 15, 1922 |
| 1,454,618 | Banks | May 8, 1923 |
| 2,035,895 | Kelly | Mar. 31, 1936 |

FOREIGN PATENTS

| Number | Country | Date |
|---|---|---|
| 696,093 | France | Oct. 7, 1930 |